United States Patent Office 3,269,981
Patented August 30, 1966

3,269,981
ORGANOTRICHLOROSILANE USAGE
John C. Goossens, Scotia, N.Y., assignor to General Electric Company, a corporation of New York
No Drawing. Filed Dec. 20, 1963, Ser. No. 332,244
6 Claims. (Cl. 260—46.5)

This invention relates to organopolysiloxanes which can be cured at room temperature to rubbery materials.

In recent years, organopolysiloxanes which are convertible at room temperature to rubbery materials have gained increased acceptance in industry and a number of room temperature curing or room temperature vulcanizing organopolysiloxanes are commercially available or described in the literature. While a number of these organopolysiloxanes are useful in many applications, it is often found that they require improvement in at least two properties. In particular, while these room temperature curing organopolysiloxanes adhere fairly well to many surface, in some applications it is desirable to have materials of improved adhesion. Likewise, while thick sections of these materials can be cured slowly at room temperature, it is often desirable to provide materials which cure with increased speed in thick section, e.g., sections as thick as ½ inch thick or more.

The present invention is based on my discovery of room temperature curing organopolysiloxanes having improved adhesion to certain substrates and which cure at an improved rate in thick sections. This invention is also directed to the method of preparing such compositions. These improved room temperature vulcanizing organopolysiloxanes comprise a liquid, silanol chain-stopped polydiorganosiloxane and a silane selected from the class consisting of silanes having the formula:

(1) $RSiCl_3$ and mixtures of said silanes and silicon tetrachloride. More particularly, the improved room temperature vulcanizing organopolysiloxane compositions of the present invention comprise (I) a liquid silanol chain-stopped polydiorganosiloxane and (II) a sufficient amount of a silane selected from the class consisting of (A) an organotrichlorosilane within the scope of Formula 1 and (B) a mixture of said organotrichlorosilane and silicon tetrachloride in an amount sufficient to provide from 0.3 to 1.2 mole of said silane per mole of silicon-bonded hydroxyl groups in the liquid silanol chain-stopped polydiorganosiloxane. Where the silane comprises a mixture of an organotrichlorosilane and silicon tetrachloride, it is preferred that the mixture contain at least 50 weight percent of the organotrichlorosilane.

The organotrichlorosilanes within the scope of Formula 1 include compounds in which the radicals represented by R are alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated monovalent hydrocarbon radicals, e.g., chloromethyl, chlorophenyl, trifluoromethylpropyl, dibromophenyl, bromohexyl, bromocyclohexenyl, etc. radicals; cyanoalkyl radicals, e.g., cyanomethyl, beta-cyanoethyl, beta-cyanopropyl, gamma-cyanopropyl, omega-cyanobutyl, etc. radicals. When the organotrichlorosilanes contain cyanoalkyl radicals, it is preferred that the radicals contain a nitrile group attached to silicon through at least two carbon atoms. While the R group of the organotrichlorosilane of Formula 1 can be any of the many radicals specifically described above, as well as any of the broader group defined for such radical, it is preferred that the radical be either a methyl or a phenyl radical with the preferred radical being methyl. Additionally, it should be understood that a mixture of organotrichlorosilanes within the scope of Formula 1 can be employed.

The liquid silanol chain-stopped polydiorganosiloxanes which can be employed in the practice of the present invention have the formula:

(2) $HO[(R')_2SiO]_nH$ where R' is a member selected from the class consisting of monovalent hydrocarbon radicals, halogenated monovalent hydrocarbon radicals and cyanoalkyl radicals, and $n$ has a value of at least 10, e.g., from about 10 to 10,000 or more. The radicals previously described as suitable for R of Formula 1 are also suitable for the R' radical of Formula 2. Preferably, the R' radicals of Formula 2 are methyl or phenyl radicals, with the preferred specific radical being methyl. It should be understood that the liquid silanol chain-stopped polydiorganosiloxane of Formula 2 can contain more than one type of R' group. For example, some of the R' groups can be methyl and others can be phenyl and/or beta-cyanoethyl. In any event, it is preferred that in any silanol chain-stopped polydiorganosiloxane employed in the practice of the present invention at least 50% of the R groups be methyl groups.

Among the many liquid silanol chain-stopped polydiorganosiloxanes within the scope of Formula 2 are included copolymers containing more than one type of diorganosiloxane unit. For example, included within such materials are copolymers of dimethylsiloxane units and methylphenylsiloxane units, as well as copolymers of dimethylsiloxane units, diphenylsiloxane units and methylvinylsiloxane units. Likewise, it is possible that a mixture of silanol chain-stopped polydiorganosiloxanes within the scope of Formula 2 can be employed. While these materials within the scope of Formula 2 have been described as polydiorganosiloxanes, it should be understood that such materials can contain minor amounts, e.g., up to about 1 percent of monoorganosiloxane units or triorganosiloxane units.

The liquid silanol chain-stopped polydiorganosiloxanes employed in the practice of the present invention vary from thin fluids up to viscous gums, depending upon the value of $n$ of Formula 2 and the nature of the particular organic groups attached to the silicon atom. Preferably, however, the silanol chain-stopped diorganopolysiloxane is selected to have a viscosity in the range of from about 100 centipoise to 50,000 centipoise when measured at 25° C.

The room temperature curing silicone rubber compositions of the present invention can be prepared by simply mixing, under substantially anhydrous conditions, the organotrichlorosilane of Formula 1, silicon tetrachloride (when silicon tetrachloride is employed), and the silanol chain-stopped liquid polydiorganosiloxane of Formula 2. Since both the organotrichlorosilane and silicon tetrachloride tend to hydrolyze upon contact with moisture, care should be exercised during the addition of these materials to the silanol chain-stopped polydiorganosiloxane to exclude moisture. Likewise, care should be taken to insure that the product obtained by mixing the organotrichlorosilane, the silicon tetrachloride and the silanol chain-stopped polydiorganosiloxane is maintained under substantially anhydrous conditions if it is desired to store the product for an extended period of time prior to conversion of the mixture to the silicone rubber state. On the other hand, if it is desired to permit the mixture to cure imediately upon the addition of the organotrichlorosilane and the silicon tetrachloride to the liquid polydiorganosiloxane, no special precautions need to be taken and the materials are merely mixed and placed in the form or shape in which it is desired for the materials to be cured.

One unexpected feature of the compositions of the present invention is the fact that the addition of too much of the organotrichlorosilane of Formula 1 or the mixture of the organotrichlorosilane and silicon tetrachloride to the liquid silanol chain-stopped polydiorganosiloxane results in a material of inferior characteristics. Likewise, it is unexpected to find that the addition of silicon tetrachloride alone, regardless of amount, to a liquid silanol chain-stopped polydiorganosiloxane also results in an inferior product. It has been found that satisfactory cured products are obtained in the case where the organotrichlorosilane of Formula 1 is used without silicon tetrachloride when the organotrichlorosilane is employed in an amount equal to from about 0.3 up to about 1.2 mole of the organotrichlorosilane per mole of silicon-bonded hydroxyl groups in the silanol chain-stopped polydiorganosiloxane. When more than 1.2 mole of the organotrichlorosilane is employed or less than about 0.3 mole is employed, the resulting material does not cure satisfactorily to a rubbery material and does not result in a product of satisfactory adhesion to substrates with which it is in contact.

The use of a mixture of the organotrichlorosilane of Formula 1 and silicon tetrachloride in the compositions of the present invention in the proper proportions unexpectedly results in cured silicone rubber compositions having improved properties, such as increased hardness and tensile strength. These improved results are obtained with mixtures of the organotrichlorosilane and silicon tetrachloride containing at least 50 weight percent of the organotrichlorosilane, based on the weight of the organotrichlorosilane and the silicon tetrachloride. When less than 50 weight percent is employed, the resulting products do not cure satisfactorily and do not exhibit proper adhesion. Likewise, it has been found that the total moles of the organotrichlorosilane of Formula 1 and the silicon tetrachloride should be in the range of from about 0.3 to 1.2 mole per mole of silicon-bonded hydroxyl groups in the liquid silanol chain-stopped polydiorganosiloxane. When more than 1.2 moles of these materials are present or less than 0.3 mole is present, the resulting materials exhibit inferior cure.

The temperature of the addition of the organotrichlorosilane of Formula 1 or the mixture of the organotrichlorosilane and the silicon tetrachloride to the liquid silanol chain-stopped polydiorganosiloxane of Formula 2 is immaterial, with the addition generally being effected at a temperature of from about 20 to 50° C.

As previously mentioned, the compositions of the present invention are converted to the solid, cured, elastic silicone rubber state by exposure of the compositions to moisture, such as atmospheric moisture. While it might be expected that exposure of such compositions to such moisture would result in a significant evolution of hydrogen chloride, it has been found that the rate of hydrogen chloride evolution is relatively slow, so that the hydrogen chloride evolved presents no greater problem than the acetic acid which is formed during the curing of room temperature vulcanizing organopolysiloxanes of the type described, for example, in French Patent 1,198,749, which are prepared by the addition of an organotriacyloxysilane, such as methyltriacetoxysilane, to a silanol chain-stopped polydiorganosiloxane fluid.

Another distinction between the compositions of the present invention and the compositions of the aforementioned French Patent 1,198,749 is the ability of the compositions of the present invention to tolerate the presence of minor amounts of difunctional materials. For example, when an attempt is made to use a mixture of methyltriacetoxysilane containing about 10% dimethyldiacetoxysilane as a curing agent for silanol chain-stopped polydiorganosiloxanes, it is found that the presence of the minor amount of the dimethyldiacetoxysilane inhibits the cure. In contrast to this, the compositions of the present invention cure satisfactorily when the organotrichlorosilane of Formula 1 contains up to 20 mole percent diorganodichlorosilane as an impurity.

The compositions prepared by mixing the liquid silanol chain-stopped polydiorganosiloxane of Formula 2 with either the organotrichlorosilane of Formula 1 or the mixture of the silane with silicon tetrachloride can be used without further modification in many sealing, caulking or coating applications by merely placing the compositions in the desired place and permitting them to cure upon exposure to moisture present in the atmosphere. Upon exposure of such compositions to atmospheric moisture, even after storage for times as long as 2 years or more, a hard "skin" will form on the composition after 20 to 30 minutes and complete cure to the rubbery state will have been effected within 24 hours, all at room temperature.

It is often desirable to modify the compositions of the present invention by the incorporation of various fillers or extenders to change various properties, such as color or cost. Illustrative of the many fillers which can be employed with the composition of the present invention are titanium dioxide, lithopone, zinc oxide, zirconium silicate, silica aerogel, iron oxide, diatomaceous earth, fumed silica, precipitated silica, glass fibers, chromic oxide, zirconium oxide, aluminum oxide, crushed quartz, calcined clays, asbestos, carbon and graphite, as well as other organic materials such as cork, cotton and synthetic fibers.

Where fillers are added to the compositions of the present invention, they are generally employed in the amounts of from about 20 to 200 parts filler per 100 parts of the liquid silanol chain-stopped polydiorganosiloxane of Formula 2. The fillers can be added at any stage in the preparation of such composition. Specifically, the fillers, the silanol chain-stopped polydiorganosiloxanes, the organotrichlorosilanes and the silicon tetrachloride can be added in any order, with adequate protection maintained to keep the entire reaction mixture substantially anhydrous if it is desired to store the resulting mixture for an extended period of time prior to use. The presence of the fillers in the compositions of the present invention has no significant effect on the curing characteristics of such compositions, with initial skinning occurring within about ½ hour at room temperature and complete cure usually being obtained within about 24 hours at room temperature.

The room temperature curing silicone rubber compositions of the present invention are particularly adapted for caulking and sealing applications where adhesion to various surfaces is important. For example, the materials are useful in household caulking applications and industrial applications such as on buildings, factories, automotive equipment and where adhesion to masonry, glass, plastic, metal and wood is required.

The following examples are illustrative of the practice of my invention and are not intended for purposes of limitation. All parts are by weight.

EXAMPLE 1

To a reaction vessel was charged 100 parts of a silanol chain-stopped polydimethylsiloxane fluid having a viscosity of about 3,000 centipoise at 25° C. and containing 0.3% by weight silicon-bonded hydroxyl groups. To this material was slowly added 2 parts of methyltrichlorosilane. Hydrogen chloride was evolved during the addition. A first portion of this material was poured into an aluminum cup to a depth of 0.2 inch and a second portion was poured into an aluminum cup to a depth of 0.4 inch. At the end of 24 hours, both samples were thoroughly cured throughout their thicknesses. When an attempt was made to strip the samples from the aluminum cups, rupture occurred in the body of the samples rather than at the interface between the samples and the aluminum cup. The product was a tough, resilient silicone rubber. A third sample of the composition was mixed with equal parts by weight of finely divided fumed silica to provide a thick paste which was spread upon a stainless steel plate to a thickness of about 10 mils. Within 3 hours, there resulted a completely cured coating of silicone rubber on the steel plate. After storage of the uncured material of this example for several months, it still cured to the same type of product as that obtained on curing immediately after preparation of the material.

EXAMPLE 2

To a reaction vessel was charged 100 parts of the silanol chain-stopped polydimethylsiloxane described in Example 1, 1.5 parts methyltrichlorosilane and 1.0 part silicon tetrachloride under anhydrous conditions. After thoroughly mixing the reactants, a portion of this material was poured into an aluminum cup to a depth of 0.2 inch and allowed to stand for 24 hours. At the end of this time, the resulting material was a cured silicone rubber slightly harder and slightly stronger than the silicone rubber prepared in Example 1 from methyltrichlorosilane alone. This material could not be stripped from the aluminum cup without destroying the rubber.

EXAMPLE 3

Following the procedure of Example 1, a number of compositions were formulated from the silanol chain-stopped polydimethylsiloxane of Example 1 and various quantities of phenyltrichlorosilane, a mixture of phenyltrichlorosilane and silicon tetrachloride or silicon tetrachloride alone. In the table below are listed the moles of phenyltrichlorosilane and/or silicon tetrachloride present per mole of silicon-bonded hydroxyl groups in the silanol chain-stopped polydimethylsiloxane. After preparing these compositions, the compositions were poured into aluminum cups to a depth of 0.2 inch and allowed to stand at room temperature for 24 hours, after which time the state of cure and the adhesion were observed. The table below presents comments on cure and adhesion.

Table 1

| Run | $C_6H_5SiCl_3$ | $SiCl_4$ | Comment |
|---|---|---|---|
| 1 | 0.1 | | No cure. |
| 2 | 0.3 | | Satisfactory. |
| 3 | 0.50 | | Do. |
| 4 | 1.0 | | Do. |
| 5 | 1.4 | | Partial cure, no adhesion. |
| 6 | | 0.1 | No cure |
| 7 | | 0.5 | Partial cure, no adhesion. |
| 8 | | 1.25 | No adhesion. |
| 9 | 0.30 | 0.10 | Satisfactory. |
| 10 | 0.20 | 0.20 | Do. |
| 11 | 0.10 | 0.30 | Poor adhesion. |
| 12 | 0.05 | 0.35 | Soft cure, no adhesion. |
| 13 | 0.10 | 0.10 | No cure. |
| 14 | 0.7 | 0.7 | Poor adhesion. |

As shown by Table 1 above, with compositions outside of the scope of the present invention, the product is defective in one or more respects, while with materials within the scope of the present invention, satisfactory products are obtained. For example, as shown by runs 1 and 5, when the amount of phenyltrichlorosilane employed is below or above the range of the present invention, a defective product results. Examples 6, 7 and 8 illustrate the fact that without any organotrichlorosilane, an unsatisfactory product is obtained. Examples 11, 12, 13 and 14 illustrate the fact that when the ratio of silicon tetrachloride to organotrichlorosilane is too high or when the total moles of organotrichlorosilane and silicon tetrachloride are too low or too high, the resulting product is defective.

EXAMPLE 4

To a reaction vessel was charged 100 parts of a silanol chain-stopped polydimethylsiloxane having a viscosity of 3500 centipoise at 25° C. and having 0.25 weight percent silicon-bonded hydroxy groups. To this material was added 2 parts of phenyltrichlorosilane. Thereafter, a portion of the resulting product was withdrawn from the reaction vessel and 10 parts of such product were mixed with 1 part each of finely divided silica and finely divided titanium dioxide and .1 part of red iron oxide. This material, which had the consistency of a thick paste, was spread upon the surface of a stainless steel plate to a depth of about 0.10 inch and allowed to stand in the atmosphere for 24 hours. At the end of this time, the material had been converted to a solid silicone rubber which was red in color.

EXAMPLE 5

To a reaction vessel is charged 100 parts of a silanol chain-stopped copolymer of 3 mole percent diphenylsiloxane units and 97 mole percent dimethylsiloxane units, which copolymer has a viscosity of about 10,000 centipoise at 25° C. and which contains 0.1 percent by weight silicon-bonded hydroxyl groups. To this copolymer is added .5 part beta-cyanoethyltrichlorosilane. A portion of the resulting mixture is mixed with equal parts by weight of carbon black to form a thick paste which is spread onto a stainless steel plate to a depth of about 10 mils. At the end of 24 hours, this material cures to a black silicone rubber.

While the foregoing examples have illustrated a number of embodiments of my invention, it should be understood that my invention is applicable broadly to organopolysiloxane compositions which are convertible to the cured, solid, elastic state and which comprise a liquid silanol chain-stopped polydiorganopolysiloxane within the scope of Formula 2 and a silane selected from the class consisting of an organotrichlorosilane within the scope of Formula 1 and a mixture of an organotrichlorosilane within the scope of Formula 1 with silicon tetrachloride, with the proportions of the respective ingredients being used in the preferred proportions previously described. These compositions are curable to the elastic state by the exposure of the compositions to moisture.

What I claim as new and desire to secure by Letters Patent of the United States is:

1. A room temperature curing organopolysiloxane composition stable under anhydrous conditions and curable to the solid, elastic state upon exposure to moisture comprising a liquid silanol chain-stopped polydiorganosiloxane having the formula:

$$HO[(R')_2SiO]_nH$$

and a silane selected from the class consisting of an organotrichlorosilane having the formula:

$$RSiCl_3$$

and a mixture of said organotrichlorosilane and silicon tetrachloride, where R and R' are members selected from the class consisting of monovalent hydrocarbon radicals, halogenated monovalent hydrocarbon radicals and cyanoalkyl radicals and $n$ has a value of at least 10, said silane being present in an amount sufficient to provide from 0.3 to 1.2 mole of said silane per mole of silicon-bonded hydroxyl groups in said polydiorganosiloxane and with said silane consisting of at least 50 percent by weight of said organotrichlorosilane based on the weight of said mixture of organotrichlorosilane and silicon tetrachloride.

2. A room temperature curing organopolysiloxane composition stable under anhydrous conditions and curable to the solid, elastic state upon exposure to moisture comprising a liquid silanol chain-stopped polydiorganosiloxane having the formula:

$$HO[(R')_2SiO]_nH$$

and an organotrichlorosilane having the formula:

$$RSiCl_3$$

where R and R' are members selected from the class consisting of monovalent hydrocarbon radicals, halogenated monovalent hydrocarbon radicals and cyanoalkyl radicals and $n$ has a value of at least 10, said organotrichlorosilane being present in an amount equal to from 0.3 to 1.2 mole per mole of silicon-bonded hydroxyl groups in said polydiorganosiloxane.

3. A composition stable under anhydrous conditions and curable to the solid, elastic state upon exposure to moisture comprising a liquid silanol chain-stopped polydimethylsiloxane having a viscosity of from about 100 centipoise to 50,000 centipoise when measured at 25° C. and an organotrichlorosilane having the formula:

$$RSiCl_3$$

where R is a member selected from the class consisting of monovalent hydrocarbon radicals, halogenated monovalent hydrocarbon radicals and cyanoalkyl radicals, said organotrichlorosilane being present in an amount equal to from 0.3 mole to 1.2 mole per mole of silicon-bonded hydroxyl groups in said polydimethylsiloxane.

4. The composition of claim 3 in which said organotrichlorosilane is methyltrichlorosilane.

5. The composition of claim 3 in which said organotrichlorosilane is phenyltrichlorosilane.

6. The process for preparing an organopolysiloxane stable under anhydrous conditions and curable upon exposure to atmospheric moisture to the solid, elastic state which process comprises adding under anhydrous conditions to a liquid silanol chain-stopped polydiorganosiloxane having the formula:

$$HO[(R')_2SiO]_nH$$

a silane compound selected from the class consisting of an organotrichlorosilane and a mixture of said organotrichlorosilane and silicon tetrachloride, where said silane is present in an amount equal to from 0.3 to 1.2 mole per mole of silicon-bonded hydroxyl groups in said polydiorganosiloxane, with said silane comprising at least 50 weight percent organotrichlorosilane, where $R'$ is an organo groups and $n$ has a value of at least 10 and where the organo groups of said polydiorganosiloxane and of said organotrichlorosilane are members selected from the class consisting of monovalent hydrocarbon radicals, halogenated monovalent hydrocarbon radicals and cyanoalkyl radicals.

References Cited by the Examiner
UNITED STATES PATENTS

| | | | |
|---|---|---|---|
| 2,610,167 | 9/1952 | Te Grotenhuis | 260—46.5 |
| 2,684,379 | 7/1954 | Guillissen et al. | 260—448.2 |
| 3,035,016 | 5/1962 | Bruner | 260—46.5 |
| 3,065,252 | 11/1962 | Brown et al. | 260—448.2 |
| 3,073,856 | 1/1963 | Dodgson | 260—448.2 |

FOREIGN PATENTS

| | | |
|---|---|---|
| 1,198,749 | 6/1959 | France. |
| 851,578 | 10/1960 | Great Britain. |

LEON J. BERCOVITZ, *Primary Examiner.*

M. I. MARQUIS, *Assistant Examiner.*